(12) United States Patent
Hwang et al.

(10) Patent No.: US 8,748,501 B2
(45) Date of Patent: Jun. 10, 2014

(54) POLYURETHANE FOAM COMPOSITION AND POLYURETHANE FOAM PREPARED USING SAME

(75) Inventors: Sung-Woo Hwang, Daejeon-si (KR); Myung-Dong Cho, Hwaseong-si (KR); Sang-Ho Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 192 days.

(21) Appl. No.: 12/827,302

(22) Filed: Jun. 30, 2010

(65) Prior Publication Data

US 2011/0054052 A1 Mar. 3, 2011

(30) Foreign Application Priority Data

Aug. 27, 2009 (KR) .................. 10-2009-0080081

(51) Int. Cl.
| | |
|---|---|
| C08G 18/48 | (2006.01) |
| C08J 9/00 | (2006.01) |
| C08G 77/46 | (2006.01) |
| C08G 18/08 | (2006.01) |
| C08G 18/00 | (2006.01) |

(52) U.S. Cl.
USPC ........... 521/119; 521/110; 521/111; 521/122; 521/155; 521/170

(58) Field of Classification Search
USPC .................. 521/110, 111, 122, 155, 170, 119
See application file for complete search history.

(56) References Cited

U.S. PATENT DOCUMENTS

| | | | | |
|---|---|---|---|---|
| 5,318,996 | A * | 6/1994 | Yu-Hallada et al. | 521/131 |
| 5,786,400 | A | 7/1998 | Brock et al. | |
| 6,518,324 | B1 * | 2/2003 | Kresta et al. | 521/83 |
| 6,967,222 | B2 * | 11/2005 | Khanarian et al. | 521/77 |
| 7,265,178 | B2 * | 9/2007 | Maier et al. | 524/507 |
| 7,282,275 | B2 * | 10/2007 | Wolk et al. | 428/690 |
| 7,306,853 | B2 * | 12/2007 | Lin et al. | 428/447 |
| 7,687,593 | B2 * | 3/2010 | Yamahiro et al. | 528/31 |
| 7,700,248 | B2 * | 4/2010 | Jin et al. | 430/58.2 |
| 7,868,112 | B2 * | 1/2011 | Oikawa et al. | 526/279 |
| 7,989,560 | B2 * | 8/2011 | Oikawa et al. | 525/455 |
| 2006/0189750 | A1 | 8/2006 | Maier et al. | |
| 2008/0020213 | A1 * | 1/2008 | Lichtenhan et al. | 428/447 |
| 2009/0042999 | A1 * | 2/2009 | Lee et al. | 521/82 |
| 2009/0270523 | A1 * | 10/2009 | Dai et al. | 521/137 |
| 2010/0093951 | A1 * | 4/2010 | Oikawa et al. | 525/474 |

FOREIGN PATENT DOCUMENTS

| | | |
|---|---|---|
| JP | 2005126695 | 5/2005 |
| JP | 2008535989 | 9/2008 |
| KR | 1020050073500 A | 7/2005 |
| WO | WO2008072765 * | 6/2008 |

OTHER PUBLICATIONS

Mabry, J.M., et al., "Fluorinated Polyhedral Oligomeric Silsesquioxanes (F-POSS)**", Hydrophobic Compounds, Angewandte Chemie, 2008, 120, pp. 4205-4208.

* cited by examiner

*Primary Examiner* — Melissa Rioja
(74) *Attorney, Agent, or Firm* — Cantor Colburn LLP

(57) ABSTRACT

A polyurethane foam composition that includes polyol, isocyanate, a catalyst, a surfactant, a physical blowing agent, a chemical blowing agent, a nucleating agent and a silsesquioxane compound is provided.

13 Claims, 4 Drawing Sheets

POLYURETHANE FOAM COMPOSITION AND POLYURETHANE FOAM PREPARED USING SAME

CROSS-REFERENCE TO RELATED APPLICATION

This application claims priority to Korean Patent Application No. 10-2009-0080081 filed on Aug. 27, 2009, and all the benefits accruing therefrom under 35 U.S.C. §119, the content of which in its entirety is herein incorporated by reference.

BACKGROUND

1. Field

This disclosure relates to a polyurethane foam composition and a polyurethane foam prepared using the same.

2. Description of the Related Art

Polyurethane foam has an excellent adiabatic effect, and it is widely used as a heat insulating material (e.g., for buildings and refrigerators/freezers).

Polyurethane foam is a soft or rigid porous polyurethane formed by mixing and reacting isocyanate and polyol with a blowing agent, a catalyst, a surfactant, a nucleating agent and other additives, and gasifying the blowing agent with heat generated from the reaction.

Conventional blowing agents are chlorofluorocarbon (CFC)-based materials. Such materials, however, have a low boiling point, often near room temperature, and they are readily evaporated by the heat generated from the reaction of isocyanate and polyol. As a result, they are environmentally polluting materials that not only destroy the ozone layer of the atmosphere but also contribute to the greenhouse effect, and the use of chlorofluorocarbon-based materials is now prohibited by the Montreal Protocol and the Kyoto Protocol.

Accordingly, the household electronic appliance industry and freezer container manufacturers have selected hydrofluorocarbon (HCFC)-based materials, e.g., HCFC-141b or cyclopentane, for use as blowing agents, substituting for the CFC-based materials in mass production. However, these materials tend to have higher vapor thermal conductivity than the chlorofluorocarbon-based materials. Since vapor thermal conductivity is the main factor affecting the thermal conductivity of polyurethane foam (i.e., vapor thermal conductivity is more significant than solid-phase (matrix) or radiation thermal conductivity), the polyurethane foam and application equipment manufactured using the substitute blowing agents have been found to exhibit poor adiabatic performance.

In addition, although the ozone depletion potential ("ODP") of hydrofluorocarbon-based materials may be lower than that of the chlorofluorocarbon-based materials, their ODP is not zero, and the hydrofluorocarbon-based materials are already listed as regulatory materials in the European Union (EU) countries, Hydrofluorocarbon-based materials further exhibit high global warming potential.

As a result of the problems associated with hydrofluorocarbon-based blowing agents, cyclopentane is drawing attention as a potential blowing agent that minimally affects the ozone layer and global warming. However, the vapor thermal conductivity of the cyclopentane is relatively high, at 0.0128 W/m·K, and polyurethane foam manufactured using cyclopentane has needed to be thick in order to provide sufficient thermal insulation. There is thus a need in the art for polyurethane foam compositions that improve the insulating performance of polyurethane foam produced therefrom.

SUMMARY

One embodiment of this disclosure provides a polyurethane foam composition for preparing a polyurethane foam having excellent adiabatic performance.

Another embodiment of this disclosure provides a polyurethane foam prepared using the polyurethane foam composition.

According to one embodiment of this disclosure, a polyurethane foam composition includes a polyol, an isocyanate, a catalyst, a surfactant, a physical blowing agent, a chemical blowing agent, a nucleating agent and a silsesquioxane compound. The silsesquioxane compound may be represented by the following Chemical Formula 1.

　　　　　Chemical Formula 1

In the above Chemical Formula 1, n is 4, 6, 8, 10 or 12, and each R is the same or different and is independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl, a partially or totally fluorine-substituted C2 to C50 alkynyl and a substituent represented by the following Chemical Formula 2.

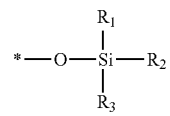　　　　　Chemical Formula 2

In the above Chemical Formula 2, $R_1$, $R_2$ and $R_3$ are the same or different and are independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl and a partially or totally fluorine-substituted C2 to C50 alkynyl.

Within certain embodiments, of Chemical Formula 1, R and $R_1$ to $R_3$ are the same or different, and are independently selected from partially or totally fluorine-substituted C1 to C10 alkyl. Within further embodiments of Chemical Formula 1, R and $R_1$ to $R_3$ are the same or different and are independently selected from —$CH_2CH_2CF_3$, —$CH_2CF_2CF_3$, —$CF_2CF_2CF_3$, —$CH_2(CH_2)_2CF_3$, —$CH_2CH_2CF_2CF_3$, —$CH_2(CF_2)_2CF_3$, —$CF_2(CF_2)_2CF_3$, —$CH_2(CH_2)_3CF_3$, —$CH_2(CH_2)_2CF_2CF_3$, —$CH_2CH_2(CF_2)_2CF_3$, —$CH_2(CF_2)_3CF_3$, —$CF_2(CF_2)_3CF_3$, —$CH_2(CH_2)_4CF_3$, —$CH_2(CH_2)_3CF_2CF_3$, —$CH_2(CH_2)_2(CF_2)_2CF_3$, —$CH_2(CH_2)_3CF_2CF_3$, —$CF_2(CF_2)_4CF_3$, —$CH_2(CH_2)_5CF_3$, —$CH_2(CH_2)_4CF_2CF_3$, —$CH_2(CH_2)_3(CF_2)_2CF_3$, —$CH_2(CH_2)_2(CF_2)_3CF_3$, —$CH_2CH_2(CF_2)_4CF_3$, —$CH_2(CF_2)_5CF_3$, —$CF_2(CF_2)_5CF_3$, —$CH_2(CH_2)_6CF_3$, —$CH_2(CH_2)_5CF_2CF_3$, —$CH_2(CH_2)_4(CF_2)_2CF_3$, —$CH_2(CH_2)_3(CF_2)_3CF_3$, —$CH_2(CH_2)_2(CF_2)_4CF_3$, —$CH_2CH_2(CF_2)_5CF_3$, —$CH_2(CF_2)_6CF_3$, —$CF_2(CF_2)_6CF_3$ and —$CH_2CH_2(CF_2)_7CF_3$. The silsesquioxane compound may be a fluorinated silsesquioxane.

In still further embodiments, the silsesquioxane compound has a water contact angle of at least about 145°.

Certain polyurethane foam compositions may include: about 100 to about 120 parts by weight of isocyanate; about 1 to about 5 parts by weight of a catalyst; about 0.5 to about 4.5 parts by weight of a surfactant; about 1 to about 3 parts by weight of a chemical blowing agent; about 10 to about 20 parts by weight of a physical blowing agent; about 0.1 to about 10 parts by weight of a nucleating agent; or about 0.005 to about 0.5 parts by weight of a silsesquioxane compound, based on 100 parts by weight of the polyol.

As another embodiment of this disclosure, a polyurethane foam prepared using the polyurethane foam composition as described above is provided.

The polyurethane foam may include polyurethane and a silsesquioxane compound. In certain exemplary embodiments of the polyurethane foam, the silsesquioxane compound may be included in an amount of about 0.005 to about 0.5 parts by weight based on 100 parts by weight of the polyol.

Within certain embodiments, the polyurethane foam may include independent cells having an average size of about 120 μm (micrometers) to about 200 μm. The independent cells may, for example, have a pore size distribution ("PSD") such that about 90% to about 98% of the independent cells exhibit an average size ranging from about 150 μm to about 180 μm.

DETAILED DESCRIPTION

Figure 1:
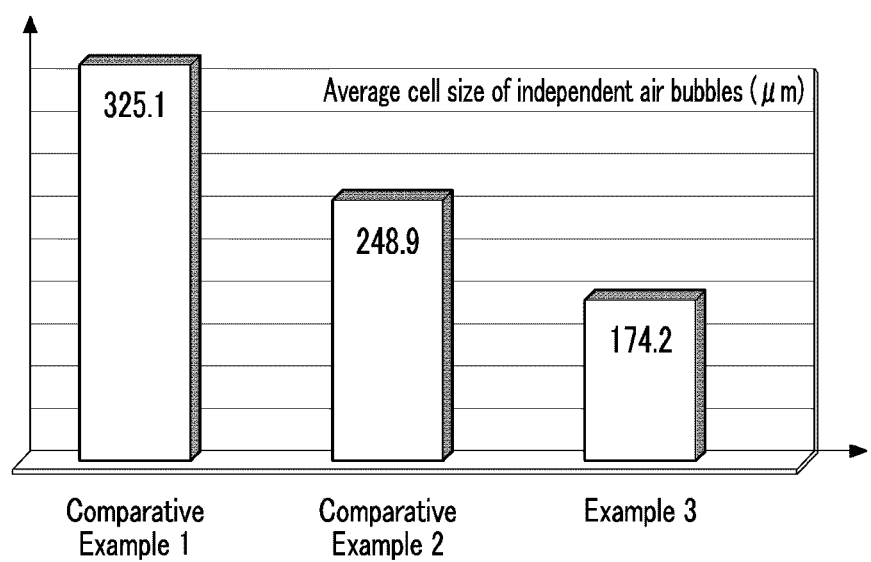
FIG. 1 is a graph illustrating average cell sizes of the exemplary polyurethane foams according to Example 1 and Comparative Examples 1 and 2.

The disclosure will be described more fully hereinafter in the following detailed description of the invention, in which some but not all embodiments of the disclosure are described. This disclosure may be embodied in many different forms and is not be construed as limited to the embodiments set forth herein; rather, these embodiments are provided so that this disclosure will be thorough and complete, and will fully convey the scope of the invention to those skilled in the art. Like reference numerals refer to like elements throughout.

As used herein, unless otherwise provided, the term "substituted" refers to a compound or radical substituted with at least one (e.g., 1, 2, 3, 4, 5, 6 or more) substituents independently selected from the list provided.

The term "partially fluorine-substituted" refers to a substituent including fluorine instead of at least one hydrogen. A "totally fluorine-substituted" substituent is one in which all hydrogens have been replaced with fluorine.

"Alkyl," as used herein, refers to refers to a straight or branched chain saturated aliphatic hydrocarbon. Alkyl groups include, for example, groups having from 1 to 50 carbon atoms (C1-C50 alkyl). "Alkenyl" is a straight or branched chain hydrocarbon that comprises at least one unsaturated hydrocarbon that has one or more unsaturated carbon-carbon bonds, at least one of which is a triple bond.

The term "cycloalkyl" refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cyclohexenyl. Cycloalkyl groups do not comprise an aromatic ring or a heterocyclic ring.

An "oxycycloalkyl" is a cycloalkyl group as described above, except that at least one oxygen atom is present as a ring member.

"Aryl," as used herein means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof.

As used herein, when a definition is not otherwise provided, the term "heterocycle" or "heterocyclic group" refers to a 5- to 50-membered heteroaryl, a 3- to 50-membered heterocycloalkyl, a 3- to 50-membered heterocycloalkenyl or a 3- to 50-membered heterocycloalkynyl, each of which comprises at least one ring, wherein each ring is independently aromatic, saturated or partially unsaturated and multiple rings, if present, may be fused, pendant, spirocyclic or a combination thereof, such that the total number of ring members ranges from 3 to 50. The term "hetero" refers to a compound including at least one heteroatom (e.g., from 1 to 4 heteroatoms) independently selected from N, O, S, Si and P present as ring member(s) in at least one ring.

As used herein, the terms "a" and "an" are open terms that may be used in conjunction with singular items or with plural items.

The polyurethane foam composition according to one embodiment includes polyol, isocyanate, a catalyst, a surfactant, a chemical blowing agent, a physical blowing agent, a nucleating agent and a silsesquioxane compound.

A "silsesquioxane compound," as used herein refers to any compound that comprises one or more silsesquioxane units (polyhedral frameworks comprising Si—O—Si linkages. Certain exemplary silsesquioxane compounds are represented by the following Chemical Formula 1.

$(RSiO_{1.5})_n$            Chemical Formula 1

In the above Chemical Formula 1, n is 4, 6, 8, 10 or 12, and each R is the same or different and is independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl, a partially or totally fluorine-substituted C2 to C50 alkynyl and a substituent represented by the following Chemical Formula 2.

Chemical Formula 2

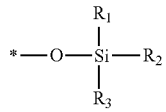

In the above Chemical Formula 2, $R_1$, $R_2$ and $R_3$ are the same or different and are independently selected from the group consisting of a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl and a partially or totally fluorine-substituted C2 to C50 alkynyl.

The silsesquioxane compound may, within certain embodiments, be fluorinated silsesquioxane.

The polyurethane foam composition is used to form a polyurethane foam. In the polyurethane foam composition according to one embodiment, the polyol reacts with the isocyanate is any aliphatic compound having more than two hydroxyl groups (—OH). Suitable polyols include, for example, polyether polyols and polyester polyols. Examples of the polyol include a polyalkylene glycol polyol such as polypropylene glycol polyol, polytetramethylene ether glycol polyol and the like; an amine terminated polyether polyol; and a polyester polyol such as adipic acid, phthalic acid, phthalic anhydride, terephthalic acid, terephthalic anhydride and the like.

In the polyurethane foam composition, known polyisocyanate compounds for rigid polyurethane foam may be used as the isocyanate without any restriction. The isocyanate may be methylene diphenyl diisocyanate ("MDI") or toluene diisocyanate ("TDI"), but is not limited thereto. Oligomers comprising the foregoing may also be used.

The amount of the isocyanate may range from about 100 to about 120 parts by weight based on 100 parts by weight of the polyol and may be used in a liquid phase or a solid phase. In certain embodiments, the isocyanate is MDI. Since liquid-phase MDI may be easily handled and improves reaction speed, the rigid polyurethane foam prepared using the liquid-phase MDI may have improved physical characteristics and may be acquired economically.

In the polyurethane foam composition, the nucleating agent functions as a nucleus for growing air cells, and tends to cause the generated air cells to be smaller and more uniform. The nucleating agent is hydrophobic while the polyol is hydrophilic. The difference in miscibility between the nucleating agent and the polyol makes the nucleating agent remain in an independent phase in the composition, instead of being dissolved in the polyol. Also, since a large amount of air is introduced due to the difference in miscibility, the nucleating agent is positioned on a cell wall of an independent cell during a foaming reaction (a process used to prepare foam), so it tends to continue to absorb heat during heat energy injection. Herein, the independent cell signifies a closed cell.

The nucleating agent may include a C3 to C8 perfluoroalkane. Examples of C3 to C8 perfluoroalkanes include perfluoropropane, perfluorobutane, perfluoroisobutane, perfluoropentane perfluoroisopentane, perfluoroneopentane, perfluorocyclopropane, perfluorocyclobutane, perfluorocyclopentane, perfluorocyclohexane, perfluorocyclooctane, perfluorohexane, perfluoro-2-methyl pentane, perfluoroheptane, perfluorooctane, perfluoro-2-ethylhexane and the like.

The polyurethane foam composition according to one embodiment may include the nucleating agent in an amount of about 0.1 to about 10 parts by weight based on 100 parts by weight of the polyol. This amount of the nucleating agent results in decreased the thermal conductivity of the polyurethane foam, which is the final resulting material.

The polyurethane foam composition according to one embodiment includes a silsesquioxane compound. The silsesquioxane compound may be represented by the following Chemical Formula 1.

$$(RSiO_{1.5})_n \quad \text{Chemical Formula 1}$$

In the above Chemical Formula 1, n is 4, 6, 8, 10 or 12, and each R is the same or different and is independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl, a partially or totally fluorine-substituted C2 to C50 alkynyl and a substituent represented by the following Chemical Formula 2.

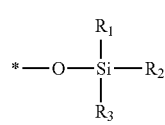

Chemical Formula 2

In the above Chemical Formula 2, $R_1$, $R_2$ and $R_3$ are the same or different and are independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl and a partially or totally fluorine-substituted C2 to C50 alkynyl.

The silsesquioxane compound of the above Chemical Formula 1 may include a silica cage and a spacer represented as R in the Chemical Formula 1. The size of the silica cage of the above Chemical Formula 1 may be determined based on the n value. In the spacer of the above Chemical Formula 1, for example, R, $R_1$, $R_2$ and $R_3$ may be the same or different, and may be independently C1 to C10 alkyls that are partially or totally substituted with fluorine. In certain embodiments, R and $R_1$ to $R_3$ are the same or different and are independently selected from the group consisting of —$CH_2CH_2CF_3$, —$CH_2CF_2CF_3$, —$CF_2CF_2CF_3$, —$CH_2(CH_2)_2CF_3$, —$CH_2CH_2CF_2CF_3$, —$CH_2(CF_2)_2CF_3$, —$CF_2(CF_2)_2CF_3$, —$CH_2(CH_2)_3CF_3$, —$CH_2(CH_2)_2CF_2CF_3$, —$CH_2CH_2(CF_2)_2CF_3$, —$CH_2(CF_2)_3CF_3$, —$CF_2(CF_2)_3CF_3$, —$CH_2(CH_2)_4CF_3$, —$CH_2(CH_2)_3CF_2CF_3$, —$CH_2(CH_2)_2(CF_2)_2CF_3$,—$CH_2(CH_2)_3CF_2CF_3$,—$CF_2(CF_2)_4CF_3$,—$CH_2(CH_2)_5CF_3$, —$CH_2(CH_2)_4CF_2CF_3$, —$CH_2(CH_2)_3(CF_2)_2CF_3$, —$CH_2(CH_2)_2(CF_2)_3CF_3$, —$CH_2CH_2(CF_2)_4CF_3$, —$CH_2(CF_2)_5CF_3$, —$CF_2(CF_2)_5CF_3$, —$CH_2(CH_2)_6CF_3$, —$CH_2(CH_2)_5CF_2CF_3$, —$CH_2(CH_2)_4(CF_2)_2CF_3$, —$CH_2(CH_2)_3(CF_2)_3CF_3$, —$CH_2(CH_2)_2(CF_2)_4CF_3$,—$CH_2CH_2(CF_2)_5CF_3$,—$CH_2(CF_2)_6CF_3$,—$CF_2(CF_2)_6CF_3$, —$CH_2CH_2(CF_2)_7CF_3$, and a combination thereof.

The fluorinated silsesquioxane compound may be superhydrophobic. As used herein, the term "superhydrophobic" signifies that a water contact angle is at least about 145°. The water contact angle may be measured using a contact angle graduator, e.g., a Future Digital Scientific ("FDS") Dataphysics Contact Analyzer System. A representative method used for measuring the water contact angle is the sessile drop method. According to the sessile drop method, the water contact angle is measured by dropping distilled water onto the surface of a glass slide coated with fluorinated silsesquioxane at room temperature with a micro-syringe, measuring the angle between a liquid tangent and the fluorinated silsesquioxane layer at a contact point of liquid-solid-gas at different positions on the surface and calculating an average of 10 measurement values.

The fluorinated silsesquioxane compound typically has a high boiling point (e.g., about 150° C. to about 170° C.), and it is not gasified at a temperature below about 130° C. Therefore, it is not gasified during the foaming process. As a result, it is not an environment pollutant, and remains in the polyurethane foam which is the final product.

The silsesquioxane compound may be added in an amount of about 0.005 to about 0.5 parts by weight based on 100 parts by weight of the polyol. This amount of the silsesquioxane compound further reduces the surface tension of the nucleating agent, while increasing the immiscibility with the polyol pre-mix. Thus, fine air bubbles are easily generated during the mixing and the air bubbles are uniformly dispersed in the polyol pre-mix.

Hereafter, the theoretical background of improving the adiabatic performance of polyurethane foam by using the silsesquioxane compound will be described in detail.

In the following Equation 1, the thermal conductivity ($\lambda_{total}$) of the polyurethane foam (which is a heat insulating material) is minimized when the radiation thermal conductivity ($\lambda_r$) inside the foam is minimized, and thus the adiabatic effect may be maximized.

$$\lambda_{total} = \lambda_g + \lambda_s + \lambda_r \qquad \text{Equation 1}$$

In Equation 1, $\lambda_g$ denotes vapor thermal conductivity (which is gas-phase thermal conductivity) representing heat transmission through air convection inside an independent air cell or another gas; $\lambda_s$ is solid-phase (matrix) thermal conductivity representing direct heat transmission by a solid-phase part of a polyurethane polymer; and $\lambda_r$ denotes radiation thermal conductivity representing heat transmission by radiation through the inside of the foam.

In the thermal conductivity ($\lambda_{total}$) of the polyurethane foam, the vapor thermal conductivity ($\lambda_g$) accounts for about 70% of the entire thermal conductivity ($\lambda_{total}$), and it is changed according to the thermal conductivity of a gas mixture of carbon dioxide, which is generated from a reaction between water and isocyanate, and a gas obtained as a physical blowing agent is gasified. When cyclopentane is used as the physical blowing agent, the thermal conductivity of the gas mixed with the carbon dioxide is known to be about 0.0133 W/m·K. The solid-phase (matrix) thermal conductivity ($\lambda_s$) may be controlled based on the density of the polyurethane foam, and it is known that the adiabatic effect is excellent in a density range of about 30 to about 40 kg/m$^3$. However, solid-phase thermal conductivity ($\lambda_s$) is not greatly changed in a typical polyurethane foam. Therefore, among the three factors related to the entire thermal conductivity ($\lambda_{total}$), it is important to minimize the radiation thermal conductivity ($\lambda_r$) in order to decrease the entire thermal conductivity ($\lambda_{total}$) value. However, the radiation thermal conductivity ($\lambda_r$) value has a relationship with the cell size of an independent air bubble of the polyurethane foam. Generally, the larger the cell size of an independent air bubble becomes, the greater the radiation thermal conductivity ($\lambda_r$) value. With the nucleating agent added thereto, fine air bubbles are generated during the initial generation of polyurethane foam, and the state lasts until the end of the reaction, thus continuing to generate independent air bubbles of a small cell size.

According to one embodiment, the silsesquioxane compound is used along with a perfluoroalkane-based nucleating agent material to improve the adiabatic performance of the polyurethane foam (which is a heat insulating material) to higher than the adiabatic performance of a conventional polyurethane heat insulating material. When the silsesquioxane compound is dissolved in the nucleating agent and used, the silsesquioxane compound is a highly hydrophobic solid-phase compound (superhydrophobic) and has a high boiling point. Accordingly, it is not gasified during the foaming process of the polyurethane foam. Since the nucleating agent with the superhydrophobic silsesquioxane compound dissolved therein has a higher immiscibility with polar polyol than the nucleating agent alone, it tends to form and maintain nuclei of fine air bubbles. Further, the superhydrophobic silsesquioxane compound decreases the surface tension of the fine air bubbles to thereby generate independent air bubbles of the polyurethane foam having a small cell size.

As noted above, the polyurethane foam compositions described herein also comprise a catalyst. Any material or substance that facilitates the reaction between the polyol and isocyanate in the polyurethane foam composition may be used as the catalyst. For example, the catalyst may be an amine-based catalyst or a metal-based catalyst. Non-limiting examples of the catalyst include tertiary amine catalysts such as triethylenediamine, N-methylmorpholine, N,N,N',N'-tetramethylethylenediamine, N,N,N',N'-tetramethylhexamethylenediamine, N,N-dimethylcyclohexylamine, and diazabicycloundecene, and metal-based catalysts such as potassium acetate and potassium octylate. Those skilled in the art may appropriately determine a suitable amount of the catalyst in the polyurethane foam composition.

In the polyurethane foam composition, the surfactant helps to secure homogeneity of ingredient materials (emulsification) and to grow air bubbles by lowering the surface tension of the urethane system as an air bubble stabilizer. The surfactant further prevents a gas from being diffused and urethane cells from becoming non-uniform by lowering the pressure difference among air bubbles, and controls the structure of air bubbles so that air bubbles are stably formed and not destroyed as they expand. Any general surfactant that is used in the preparation of rigid polyurethane foam may be used; suitable surfactants include, for example, silicon-based surfactants. Non-limiting examples of silicon surfactants include polydimethylsiloxane and a graft copolymer or block copolymer of polydimethylsiloxane and polyalkylene oxide. Examples of the polyalkylene oxide include polyethylene oxide, polypropylene oxide and a random copolymer or block copolymer of ethylene oxide and propylene oxide, having a weight average molecular weight of about 5000 to about 8000.

In certain embodiments, the amount of the surfactant ranges from about 0.5 to about 4.5 parts by weight based on 100 parts by weight of the polyol. An amount of the surfactant in this range typically increases the mixibility of the polyol pre-mix and contributes to improvement in stability, generation of air bubbles and stability of the air bubbles.

The polyurethane foam composition further includes a physical blowing agent and a chemical blowing agent. The physical blowing agent is a blowing agent that forms air bubbles but is not involved in polymerization by mixing a gas or using a decomposition-type or evaporation-type blowing agent to generate reaction heat. The chemical blowing agent generates air bubbles with gas generated from a chemical reaction.

The physical blowing agent of the polyurethane foam composition is gasified and removed during a foaming process, so it does not exist in the final foam product. Representative blowing agents include, for example, hydrocarbons, (e.g., a C3 to C8 hydrocarbon, such as isobutane and isopentane). Alternatively, the physical blowing agent may be a C5 to C6 cycloalkane. Cyclopentane, for example, exhibits an excellent foaming reaction, and may be used to prepare a foam product with excellent porosity. Cyclopentane has the lowest vapor thermal conductivity among hydrocarbons and it has a minimal effect on the ozone layer and global warming. As noted above, however, cyclopentane has presented a problem of low adiabatic performance, compared to a blowing agent based on chlorohydrocarbon. Using the compositions provided herein, it is possible to improve the adiabatic performance of polyurethane foams prepared using cyclopentane by using a nucleating agent and a silsesquioxane compound dissolved in the nucleating agent added to a polyol pre-mix. Therefore, the compositions provided herein permit the use of cyclopentane and thus decreases the adverse environmental effects.

The amount of the physical blowing agent may, in certain embodiments, range from about 10.0 to about 20.0 parts by weight based on 100 parts by weight of the polyol. Within this range, the thermal conductivity of the final polyurethane foam may be controlled to be low and the final polyurethane foam may be prepared with sufficient strength in an optimum density.

A chemical blowing agent may be used along with the physical blowing agent. In certain embodiments, the chemical blowing agent may be used in an amount of about 1 to about 3 parts by weight based on 100 parts by weight of the polyol. Within this range, the speed of the foaming reaction may be appropriately controlled in the foaming process of the polyurethane foam, and the independent air bubbles may be formed with a small cell size.

The polyurethane foam composition may further include one or more additives that are widely known to those skilled in the art. Non-limiting examples of such additives include flame retardants, colorants and antioxidants.

A suitable flame retardant for use in the polyurethane foam composition may include a metal compound such as a halogen-containing compound, organic phosphoric acid esters, antimony trioxide and aluminum hydroxide. Organic phosphoric acid esters may deteriorate the physical characteristics of the acquired rigid polyurethane foam when added in excessive amounts. Also, metal compound powder flame retardants may inhibit foaming when added in excessive amounts. Therefore, the amount of the flame retardant should be maintained in a range that does not cause the aforementioned problems. Selecting a suitable amount is a matter of routine for those of ordinary skill in the art.

Hereafter, a method for preparing polyurethane foam according to one embodiment will be described.

First, a silsesquioxane compound is added to a nucleating agent and dissolved. A polyol pre-mix is prepared to include a solution prepared by dissolving the silsesquioxane compound in a nucleating agent, a polyol, a catalyst, a surfactant and water. Subsequently, the physical blowing agent and isocyanate are added to the polyol pre-mix and the resultant mixture is used for foam molding. In the foaming process, a polyurethane foam may be prepared as the blowing agent is gasified and locked inside the cells of independent air bubbles at the same time as the polyurethane foam becomes a solid phase.

Since the silsesquioxane compound is superhydrophobic, it may not dissolve in a fluorinated physical blowing agent. For example, the silsesquioxane compound may not be dissolved in perfluoroalkane, which is a conventional nucleating agent. Therefore, when the mixed solution of the nucleating agent and the silsesquioxane compound is added to the polyol pre-mix system, its surface tension is decreased and the cell size of generated air bubbles becomes small.

The silsesquioxane compound may be dissolved in the nucleating agent at room temperature (which ranges from about 20° C. to about 25° C.) in a concentration of about 0.01 wt % to saturation. The saturation concentration of the silsesquioxane compound at room temperature differs according to the fluorinated functional group, which is a substitution group of the silsesquioxane compound. Generally, the saturation concentration is about 5 wt % based on the total weight of a mixture of the nucleating agent and the silsesquioxane compound.

The nucleating agent including the silsesquioxane compound dissolved therein may, in certain embodiments, be added in an amount of about 0.1 parts by weight to about 10 parts by weight based on 100 parts by weight of the polyol.

Since the polyurethane foam prepared according to the above-described manufacturing method has excellent thermal stability at a temperature lower than room temperature, it may be used in a low-temperature environment, such as for a refrigerator.

With the polyurethane foam composition, it is possible to manufacture rigid polyurethane foam that is produced continuously such as slabstock foam and sandwich panels, rigid polyurethane foam that is injection-molded and spray foam.

The polyurethane foam according to another embodiment of the present disclosure comprises both the polyurethane and the silsesquioxane compound. The polyurethane foam may include the silsesquioxane compound in an amount of about 0.01 wt % to about 1.1 wt % based on the total weight of the polyurethane foam. When the polyurethane foam includes the silsesquioxane compound in an amount that is within this range, the environment pollution is minimized because the silsesquioxane compound is not gasified when the polyurethane foam is used.

The cell size of the independent air bubbles ranges from about 150 μm to about 200 μm in the polyurethane foam. In case of a conventional polyurethane foam without a nucleating agent added thereto, the average cell size of independent air bubbles formed from foaming generally ranges from about 300 μm to about 400 μm. When a perfluoroalkane-based material is used as a nucleating agent, the average cell size of independent air bubbles in the acquired polyurethane foam ranges from about 200 μm to about 280 μm.

The independent air bubbles are formed in a uniform size in the polyurethane foam. The cell size distribution of the independent air bubbles may be confirmed from a PSD measurement result. It can be seen from the results provided below that pores having an independent air bubble size ranging from of about 150 μm to about 180 μm account for about 90% to about 98% of the total pores. When the cell size of the independent air bubbles is uniform in the polyurethane foam, a stable adiabatic effect may be secured.

Hereinafter, this disclosure is illustrated in more detail with reference to examples. However, they are exemplary embodiments of this disclosure and are not limiting.

EXAMPLE 1

A polyol pre-mix is prepared by mixing about 100 parts by weight of polypropylene glycol as a polyol, about 2.3 parts by weight of a catalyst mixture of triethylamine and Dow Corning PC-8 as a catalyst, about 2.5 parts by weight of polydimethylsiloxane as a surfactant and about 1.75 parts by weight of water as a chemical blowing agent. A solution is prepared by dissolving (1H,1H,2H,2H-heptadecafluorodecyl)$_8$Si$_8$O$_{12}$, which is a silsesquioxane compound of Chemical Formula 1 where R is —CH$_2$CH$_2$CF$_{27}$CF$_3$ and n is 8, the in PF5056 (produced by 3M company), which is a nucleating agent, with a saturation concentration of about 5 wt % at a temperature of about 25° C. The prepared solution is filtered, and the filtrate is added to the polyol pre-mix in an amount of about 3 parts by weight based on 100 parts by weight of polyol. The resultant solution is agitated while gradually increasing the agitation rate to about 5000 rpm for about 20 seconds. About 16.5 parts by weight of cyclopentane is added to the agitated solution as a blowing agent and then agitated. About 112 parts by weight of polyisocyanate is added to the acquired mixture and then agitated at about 5000 rpm for about 3 seconds.

The acquired mixture is poured into a mold of a 200×200× 30 mm size, foamed to be molded, solidified for about 8 minutes and removed from the mold. Herein, the mold temperature is kept uniform at about 40° C. to prepare polyurethane foam.

COMPARATIVE EXAMPLE 1

The same process as in Example 1 is performed, but without using a nucleating agent and a silsesquioxane compound.

COMPARATIVE EXAMPLE 2

The same process as in Example 1 is performed without using a silsesquioxane compound, while about 3 parts by weight of PF5056 is added based on 100 parts by weight of polyol as a nucleating agent.

The bulk density and thermal conductivity of the polyurethane foams prepared according to Example 1 and Comparative Examples 1 and 2 were measured and the measurement results are presented in the following Table 1. Also, the thermal conductivities of the polyurethane foams prepared according to Example 1 and Comparative Examples 1 and 2 were measured with a heat flow meter (Model No.: HFM 436/3/1 Lamda), produced by the NETXSCH Company, under the conditions of ISO 8310/ASTM C518.

TABLE 1

| | nucleating agent | nucleating agent amount (parts by weight) | silsesquioxane compound | bulk density (kg/m³) | thermal conductivity (W/m · k) |
|---|---|---|---|---|---|
| Example 1 | PF5056 | 3 | ◯ | 32.67 | 0.0182 |
| Comparative Example 1 | — | 3 | X | 31.76 | 0.0200 |
| Comparative Example 2 | PF5056 | 3 | X | 31.46 | 0.0194 |

It can be seen from Table 1 that the polyurethane foam of Example 1 exhibits decreased thermal conductivity compared to those of Comparative Examples 1 to 2.

Figure 2:
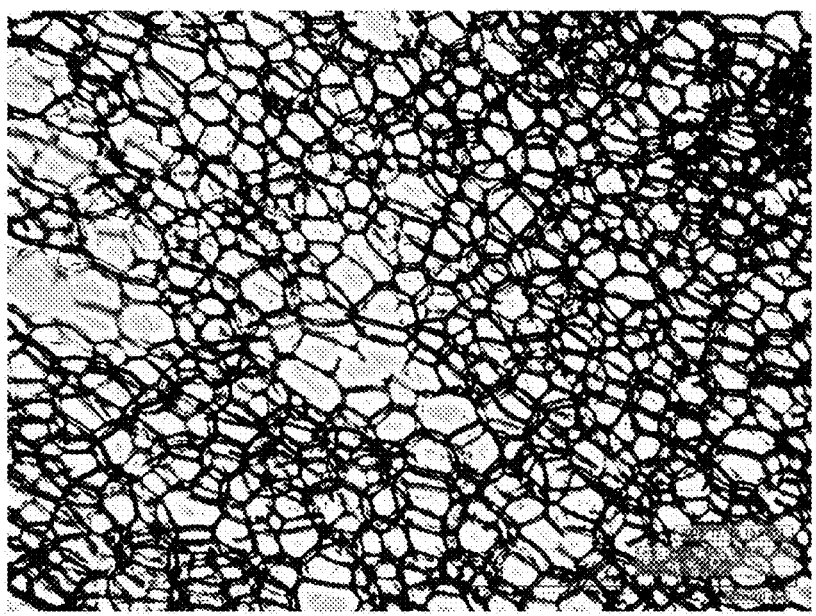
FIG. 2 is an optical microscopic photograph of the exemplary polyurethane foam according to Example 1.
Figure 3:
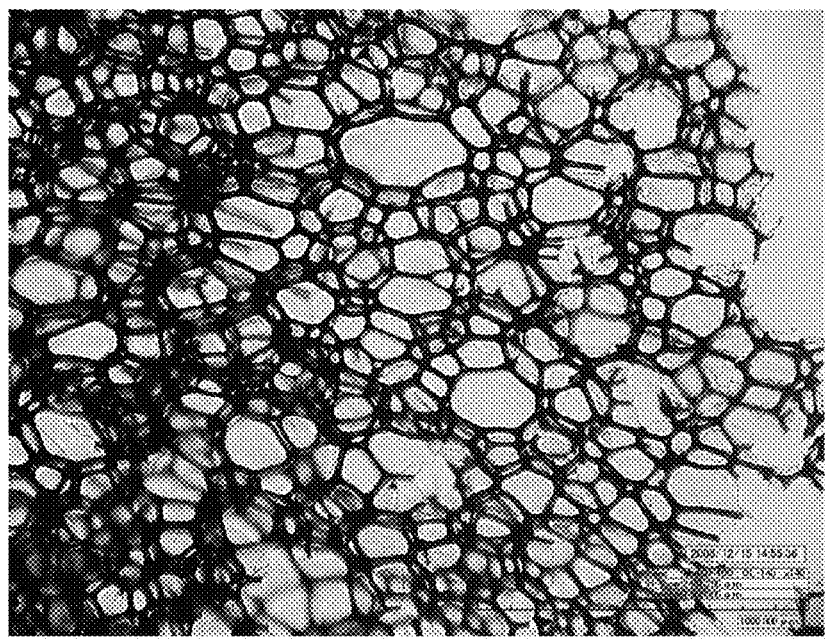
FIG. 3 is an optical microscopic photograph of the polyurethane foam according to Comparative Example 1.
Figure 4:
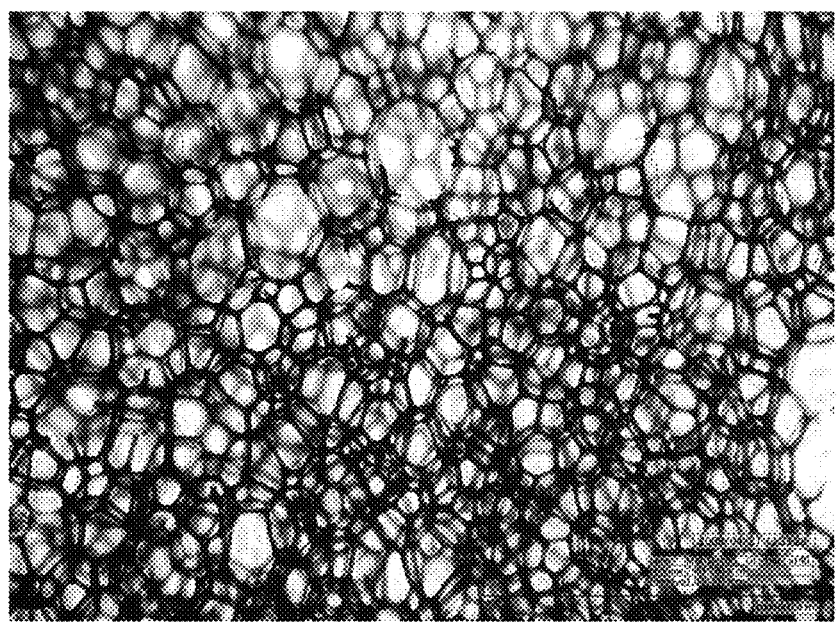
FIG. 4 is an optical microscopic photograph of the polyurethane foam according to Comparative Example 2. The scale of FIGS. 2, 3, and 4 is the same (bar=1000 micrometers).

FIG. 1 shows the average size of independent air bubbles of the polyurethane foams prepared according to Example 1 and Comparative Examples 1 and 2, and FIGS. 2 to 4 are optical microscopic pictures showing a microstructure of the independent air bubbles of the polyurethane foams prepared according to Example 1 and Comparative Examples 1 and 2. Referring to FIG. 1, the average cell size of the polyurethane foam prepared according to Example 1 was decreased by 53.5% compared to the average cell size of Comparative Example 1. FIG. 2 is an optical microscopic photograph of the polyurethane foam prepared according to Example 1, and FIG. 3 is an optical microscopic photograph of the polyurethane foam prepared according to Comparative Example 1.

FIG. 4 is an optical microscopic photograph of the polyurethane foam prepared according to Comparative Example 2. It can be seen from FIGS. 2 to 4 that the cell size of the independent air bubbles of the polyurethane foam prepared according to Example 1, which is shown in FIG. 2, is smaller than the cell size of the independent air bubbles of the polyurethane foam prepared according to Comparative Example 1 (shown in FIG. 3) and Comparative Example 2 (shown in FIG. 4). The cell size of the independent air bubbles of the polyurethane foam prepared according to Example 1 is decreased by more than about 50% compared to that of the polyurethane foam prepared according to Comparative Example 1.

The polyurethane foam has independent air bubbles of a uniform size. The PSD of the cell size of the independent air bubbles is measured by preparing specimens of a size of 1×1 cm, taking more than 10 pictures for each sample with a digital optical microscope (KH-7700, Hirox) and measuring and normalizing the size of each independent air bubble with ImagePartner™ (produced by Paran Optical company), which is image analysis software. The measurement result shows that the independent air bubbles of the polyurethane foam having a size of about 150 µm to about 180 µm accounts for about 90% of the all independent air bubbles. When the polyurethane foam has independent air bubbles of a uniform size like this, a stable adiabatic effect is secured all over the prepared polyurethane foam.

While this disclosure has been described in connection with what is presently considered to be practical exemplary embodiments, it is to be understood that this disclosure is not limited to the disclosed embodiments, but, on the contrary, is intended to cover various modifications and equivalent arrangements included within the spirit and scope of the appended claims.

What is claimed is:
1. A polyurethane foam composition comprising:
a polyol, an isocyanate, a catalyst, a surfactant, a physical blowing agent, a chemical blowing agent, a perfluoroalkane nucleating agent and a fluorinated silsesquioxane compound,
wherein a weight of the perfluoroalkane-based nucleating agent ranges from about 0.1 to about 10 parts by weight and a weight of the fluorinated silsesquioxane ranges from about 0.005 to about 0.5 parts by weight, based on 100 parts by weight of the polyol, and
wherein the composition is effective to form a polyurethane foam including about 90% to about 98% of independent cells having an average size of about 150 µm to about 180 µm.

2. The polyurethane foam composition of claim 1, wherein the fluorinated silsesquioxane compound is represented by the following Chemical Formula 1:

$$(RSiO_{1.5})_n \quad \quad \text{Chemical Formula 1}$$

wherein each R is the same or different and is independently selected from partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50- membered heterocyclic group, a partially or totally fluorine-substituted C2 to C50 alkenyl, a partially or totally fluorine-substituted C2 to C50 alkynyl and a substituent represented by the following Chemical Formula 2:

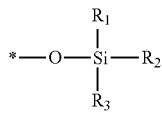

Chemical Formula 2 wherein $R_1$, $R_2$ and $R_3$ are the same or different and are independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl and a partially or totally fluorine-substituted C2 to C50 alkynyl, and n is 4, 6, 8, 10 or 12.

3. The polyurethane foam composition of claim 2, wherein R and $R_1$ to $R_3$ are the same or different, and are independently selected from partially or totally fluorine-substituted C1 to C10 alkyl.

4. The polyurethane foam composition of claim 2, wherein R and $R_1$ to $R_3$ are the same or different and are independently selected from —$CH_2CH_2CF_3$, —$CH_2CF_2CF_3$, —$CF_2CF_2CF_3$, —$CH_2(CH_2)_2CF_3$, —$CH_2CH_2CF_2CF_3$, —$CH_2(CF_2)_2CF_3$, —$CF_2(CF_2)_2CF_3$, —$CH_2(CH_2)_3CF_3$, —$CH_2(CH_2)_2CF_2CF_3$, —$CH_2CH_2(CF_2)_2CF_3$, —$CH_2(CF_2)_3CF_3$, —$CF_2(CF_2)_3CF_3$, —$CH_2(CH_2)_4CF_3$, —$CH_2(CH_2)_3CF_2CF_3$, —$CH_2(CH_2)_2(CF_2)_2CF_3$, —$CH_2(CH_2)_3CF_2CF_3$, —$CF_2(CF_2)_4CF_3$, —$CH_2(CH_2)_5CF_3$, —$CH_2(CH_2)_4CF_2CF_3$, —$CH_2(CH_2)_3(CF_2)_2CF_3$, —$CH_2(CH_2)_2(CF_2)_3CF_3$, —$CH_2CH_2(CF_2)_4CF_3$, —$CH_2(CF_2)_5CF_3$, —$CF_2(CH_2)_5CF_3$, —$CH_2(CH_2)_6CF_3$, —$CH_2(CH_2)_5CF_2CF_3$, —$CH_2(CH_2)_4(CF_2)_2CF_3$, —$CH_2(CH_2)_3(CF_2)_3CF_3$, —$CH_2(CH_2)_2(CF_2)_4CF_3$, —$CH_2CH_2(CF_2)_5CF_3$, —$CH_2(CF_2)_6CF_3$, —$CF_2(CF_2)_6CF_3$ and —$CH_2CH_2(CF_2)_7CF_3$.

5. The polyurethane foam composition of claim 1, wherein the fluorinated silsesquioxane compound has a water contact angle of at least about 145°.

6. The polyurethane foam composition of claim 1, wherein the polyurethane foam composition comprises: about 100 to about 120 parts by weight of the isocyanate; about 1 to about 5 parts by weight of the catalyst; about 0.5 to about 4.5 parts by weight of the surfactant; about 1 to about 3 parts by weight of the chemical blowing agent; about 10 to about 20 parts by weight of the physical blowing agent; about 0.1 to about 10 parts by weight of the perfluoroalkane nucleating agent, based on 100 parts by weight of the polyol.

7. A polyurethane foam prepared using the polyurethane foam composition according to claim 1.

8. A polyurethane foam comprising:
polyurethane; and
a fluorinated silsesquioxane compound,
wherein a weight of the fluorinated silsesquioxane ranges from about 0.005 to about 0.5 parts by weight, based on 100 parts by weight of the polyol, and
wherein the polyurethane foam comprises about 90% to about 98% of independent cells having an average size of about 150 μm to about 180 μm.

9. The polyurethane foam of claim 8, wherein the fluorinated silsesquioxane compound is represented by the following Chemical Formula 1:

$$(RSiO_{1.5})_n$$  Chemical Formula 1 wherein each R is the same or different and is independently a substituent selected from partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl, a partially or totally fluorine-substituted C2 to C50 alkynyl and a substituent represented by the following Chemical Formula 2:

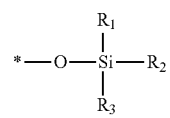

Chemical Formula 2 wherein $R_1$, $R_2$ and $R_3$ are the same or different and are independently selected from a partially or totally fluorine-substituted C1 to C50 alkyl, a partially or totally fluorine-substituted C3 to C50 cycloalkyl, a partially or totally fluorine-substituted C3 to C50 oxycycloalkyl, a partially or totally fluorine-substituted C6 to C50 aryl, a partially or totally fluorine-substituted 3- to 50-membered heterocyclic group, a partially or totally fluorine-substituted C2 to C50 alkenyl and a partially or totally fluorine-substituted C2 to C50 alkynyl; and n is 4, 6, 8, 10 or 12.

10. The polyurethane foam of claim 8, wherein R and $R_1$ to $R_3$ are the same or different and are independently selected from a partially or totally fluorine-substituted C1 to C10 alkyl.

11. The polyurethane foam of claim 8, wherein R and $R_1$ to $R_3$ are the same or different and are independently selected from —$CH_2CH_2CF_3$, —$CH_2CF_2CF_3$, —$CF_2CF_2CF_3$, —$CH_2(CH_2)_2CF_3$, —$CH_2CH_2CF_2CF_3$, —$CH_2(CF_2)_2CF_3$, —$CF_2(CF_2)_2CF_3$, —$CH_2(CH_2)_3CF_3$, —$CH_2(CH_2)_2CF_2CF_3$, —$CH_2CH_2(CF_2)_2CF_3$, —$CH_2(CF_2)_3CF_3$, —$CF_2(CF_2)_3CF_3$, —$CH_2(CH_2)_4CF_3$, —$CH_2(CH_2)_3CF_2CF_3$, —$CH_2(CH_2)_2(CF_2)_2CF_3$, —$CH_2(CH_2)_3CF_2CF_3$, —$CF_2(CF_2)_4CF_3$, —$CH_2(CH_2)_5CF_3$, —$CH_2(CH_2)_4CF_2CF_3$, —$CH_2(CH_2)_3(CF_2)_2CF_3$, —$CH_2(CH_2)_2(CF_2)_3CF_3$, —$CH_2CH_2(CF_2)_4CF_3$, —$CH_2(CF_2)_5CF_3$, —$CF_2(CF_2)_5CF_3$, —$CH_2(CH_2)_6CF_3$, —$CH_2(CH_2)_5CF_2CF_3$, —$CH_2(CH_2)_4(CF_2)_2CF_3$, —$CH_2(CH_2)_3(CF_2)_3CF_3$, —$CH_2(CH_2)_2(CF_2)_4CF_3$, —$CH_2CH_2(CF_2)_5CF_3$, —$CH_2(CF_2)_6CF_3$, —$CF_2(CF_2)_6CF_3$ and —$CH_2CH_2(CF_2)_7CF_3$.

12. The polyurethane foam of claim 8, wherein the fluorinated silsesquioxane compound has a water contact angle of at least about 145°.

13. The polyurethane foam composition of claim 1, wherein the perfluoroalkane is a C3 to C8 perfluoroalkane.

* * * * *